United States Patent [19]
Garnett

[11] 3,908,720
[45] Sept. 30, 1975

[54] CONTROL OF DUST DURING DISCHARGE OF MATERIALS INTO HOPPERS

[75] Inventor: George William Garnett, Stockton-on-Tees, England

[73] Assignee: Imperial Chemical Industries Limited, London, England

[22] Filed: Oct. 19, 1973

[21] Appl. No.: 407,955

[30] Foreign Application Priority Data
Oct. 19, 1972 United Kingdom............... 48204/72

[52] U.S. Cl. .................... 141/93; 55/431; 141/286; 209/23; 209/27; 209/244
[51] Int. Cl.² ... B01D 45/02; B07B 9/02; B65B 1/28
[58] Field of Search .......... 141/85, 89, 93, 286, 44; 209/21, 22, 23, 24, 25, 26, 27, 28, 29, 244; 55/431, 467

[56] References Cited
UNITED STATES PATENTS
3,462,920  8/1969  Denny.................................. 55/467
FOREIGN PATENTS OR APPLICATIONS
408,810  4/1934  United Kingdom.................. 141/93

Primary Examiner—Samuel B. Rothberg
Assistant Examiner—Steven L. Stephan
Attorney, Agent, or Firm—Cushman, Darby & Cushman

[57] ABSTRACT

A hopper for dusty materials includes, near the top thereof, surrounded by dust-settling chamber(s) and apertures above and below the grid allowing dust to pass from the grid into the chamber (s), the chamber(s) being provided with dust-extracting vent(s) adapted to be connected to dust-extracting means.

9 Claims, 4 Drawing Figures

CONTROL OF DUST DURING DISCHARGE OF MATERIALS INTO HOPPERS

The present invention relates to the bulk-handling of particulate (including granular, crushed and powdered) "dusty" bulk materials which, when discharged by gravity into hoppers (for example during the unloading by crane grabs from ships' holds, railway wagons or the like) cause clouds of dust which are dirty, obnoxious, and possibly harmful to people living or working in the vicinity and to neighbouring organizations and installations. This particular nuisance has recently attracted much public attention, but despite efforts to eliminate or minimise it, no satisfactory solution of the problem has been found.

The invention is particularly, but not exclusively, applicable to the unloading from ships of bulk materials at high ship-discharge-rates (e.g. >200 tons/hr) using an unloader such as a conventional mobile crane, located on the warf and carrying its own discharge hopper, conveyor belt, etc. The hopper supports a hood into which the bulk material is discharged by the crane grab (e.g., >5 tons at a time), and falls onto and through a coarse horizontal grid (e.g., 6 = 6×) located where the hood and hopper meet, into and through the hopper and onto a conveyor belt of the like. Using such conventional equipment, dust clouds are formed above, below, and around the periphery of the grid, and escape to the atmosphere through the top of the hood and the bottom of the hopper, giving rise to the above-mentioned nuisance.

The object of the present invention is to minimise the emmision of such dust clouds to the atmosphere by controlling the dust clouds formed below and around the periphery of the grid, above and around the periphery of the grid, and preferably also in the upper part of the hood.

The invention accordingly provides dust-control apparatus for a hopper, the said apparatus being located at or near the top of the hopper and comprising a substantially horizontal grid, one or more dust-settling chambers surrounding the grid, a plurality of apertures located above the grid and permitting access of dust from above the grid into the upper part of the chamber(s), a plurality of apertures located below the grid and permitting access of dust from below the grid into the lower part of the chamber(s), the chamber(s) being provided with at least one dust-extracting vent or the like adapted to be connected to dustextracting means, such as an air duct and extractor fan.

In a preferred embodiment of the invention, the hopper is surmounted by a hood, and the apparatus is located between the hood and the hopper. Preferably the top of the hood is wholly or partially closed, the side of the hood is provided with an opening only sufficiently large to allow a load of the material, e.g., a crane grab to enter and discharge its load within the hood, and the upper part of the hood is provided with at least one dust-extracting vent or the like adapted to be connected to dust-extracting means, such as an air duct and extractor fan.

The invention is hereinafter described with reference to the accompanying drawings, wherein.

Figure 1:
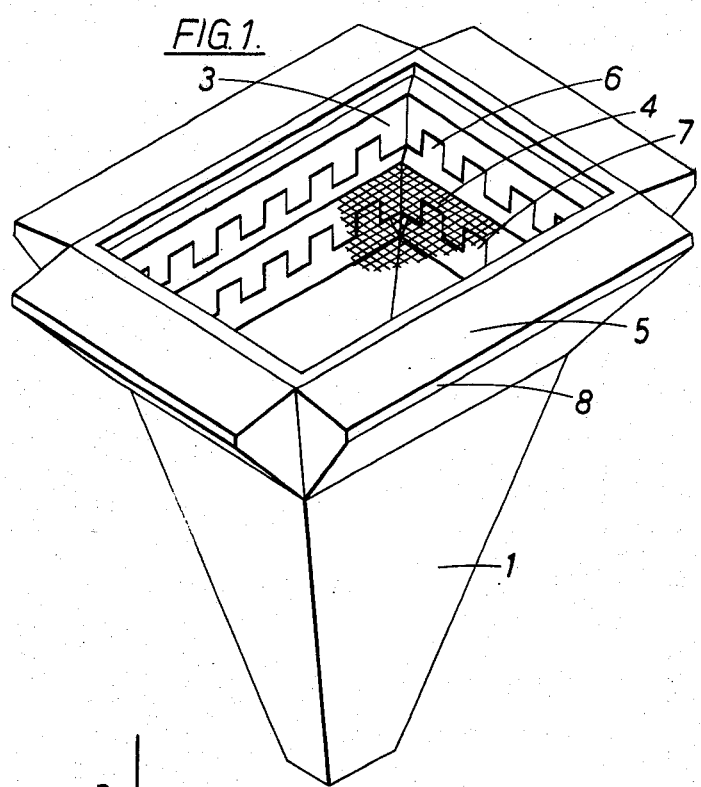
FIG. 1 is a perspective view of a hopper provided with a dust-control apparatus according to the invention.
Figure 2:
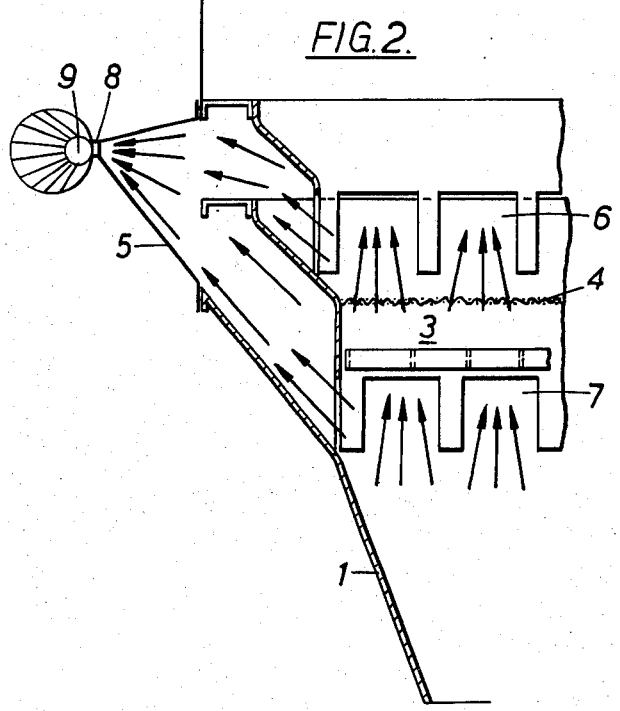
FIG. 2 is a sectional view of a hopper and hood provided with a dust-control apparatus according to the invention.
Figure 3:
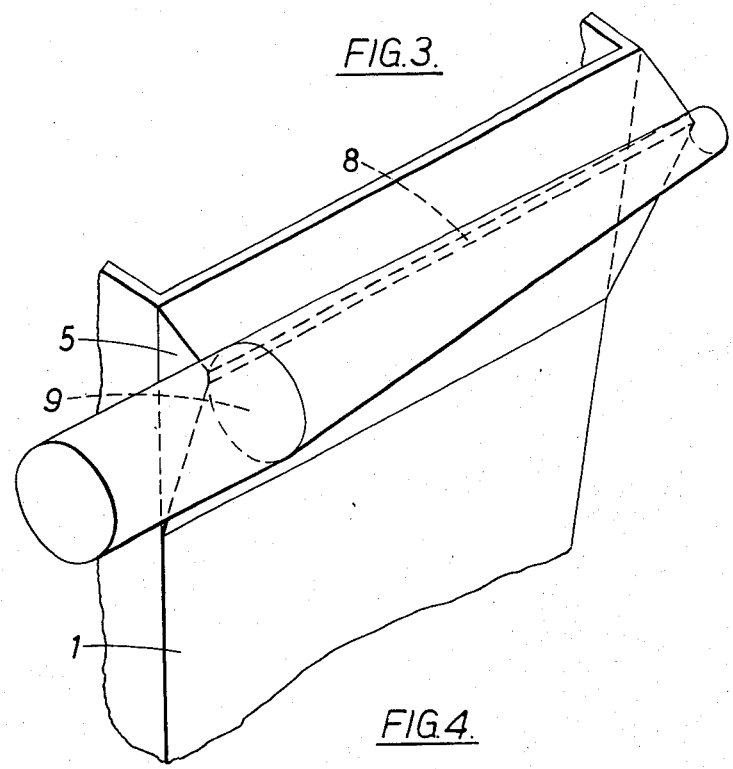
Figure 4:
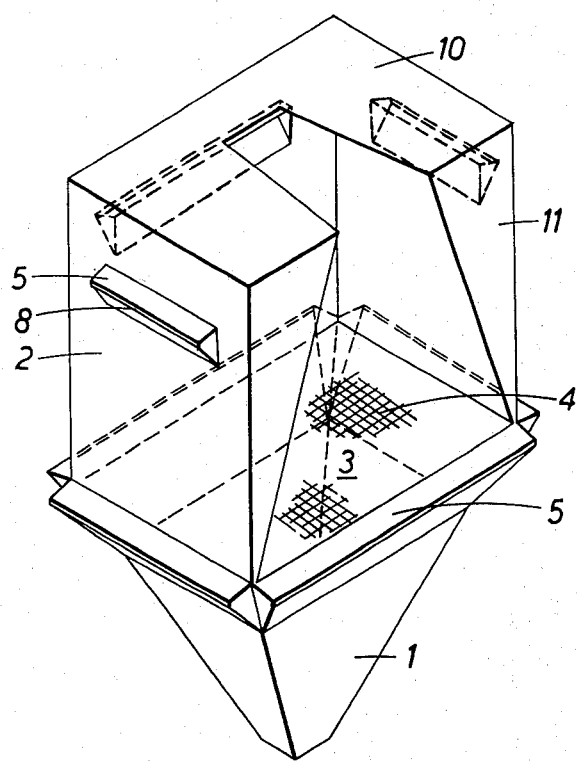

FIG. 3 is a detailed perspective view illustrating the connection of a dust-extracting vent to an air duct; and FIG. 4 is a perspective view of the hopper shown in FIG. 1, provided also with an improved hood. Referring to the drawings, a hopper 1 and hood 2 are separated by the dust-control apparatus of the invention, generally designated 3. The latter comprises a substantially horizontal coarse grid 4 which is secured by its edge, or by each of its edges, to a chamber 5 of substantially triangular cross-section. When the "dusty" material being discharged into the hood 2 hits the grid 4, the dust clouds so formed pass into the chamber(s) 5, through apertures 6 provided above the grid and apertures 7 provided below the grid, being drawn therethrough by an extractor fan or the like (as hereinafter described). As shown in FIG. 2, dust clouds forming above the grid 4 tend to be drawn into the upper part of the chamber(s) 5 and dust clouds forming below the grid 4 tend to be drawn into the lower part of the chamber(s) 5. In either case, much of the dust settles in the chamber(s) 5, the angle of inclination of the lower surface of which is so chosen, having regard to the angle of repose of the material being unloaded, that the settled dust slides gently back to rejoin the material in the hopper without forming a cloud.

The, or each of the, chambers 5 is provided at its apex with a dust-extracting vent 8, in the form of a critical velocity slot, which is connected to suitably shaped ducting 9 controlled by dust-extracting means such as an extractor fan or the like (not shown). This extracts air and dust from the chamber and leads it to a suitable de-duster for the kind of material being unloaded. The de-duster may be located on the unloader, e.g., a conventional mobile crane, and may discharge the collected dust to the crane conveyor belt.

All the ducting 9 may be connected to a common duct leading to the de-duster. It will be appreciated that the rate at which air and dust is withdrawn from the chambers 5 by the dust-extracting means should be controlled to ensure that it is high enough to draw the dust clouds above and below the grid 4 through the apertures 6,7, but not so high as to extract dust which might otherwise settle in the chambers 5 and slide back into the hopper 1 as described above. The use of critical velocity slotted vents 8 permits accurate control over the amount of air and dust drawn from various zones of the hopper (and of the hood, as will be evident hereinafter) and, furthermore, by partial or temporary closure of the connection to the ducting 9, can allow the air-withdrawl rates to be reduced in some zones where operation with a particular type of material shows this to be desirable.

FIG. 4 illustrates an improvement in the hood 2 for use in this invention. The top 10 of the hood is wholly or partially closed (allowing room only for movement into and out of the hood of the crane grab), three sides of the hood are closed, and the fourth side 11 is wholly or partially open (once again, allowing room only for movement into and out of the hood of the crane grab).

The top 10 and/or the fourth side 11 of the hood may be fitted with an aircurtain which permits movement into and out of the hood of the crane grab but which inhibits the escape of dust-clouds therethrough.

The closed sides of the hood are provided with dust-extracting vents 8 similar to those described above (and adapted to be connected, in similar fashion, to the same de-duster). These improvements to the hood make it possible to control, to a very considerable degree, the dust clouds which are normally formed in and around the hood.

Although the invention has been described herein with particular reference to the unloading of ships at high discharge rates, the invention is equally applicable to the many other cases where "dusty" bulk materials are discharged into hoppers.

I claim:

1. Dust-control apparatus for a hopper, the said apparatus being located adjacent the top of the hopper and comprising a substantially horizintal grid, at least one dust-settling chamber surrounding the grid, a plurality of apertures located above the grid and permitting access of dust from above the grid into the upper part of the chamber, a plurality of apertures located below the grid and permitting access of dust from below the grid into the lower part of the chamber, at least one dust-extracting vent in the wall of the chamber and means for connecting the vent to dust-extracting ducting.

2. Apparatus as claimed in claim 1, wherein the dust-settling chamber is of substantially triangular cross-section and the grid is secured thereto by an edge thereof.

3. Apparatus as claimed in claim 2, wherein the dust-extracting vent is located substantially at the apex of the triangular chamber and is in the form of a slot adapted to be connected to the dust-extracting ducting.

4. In combination, a hopper having a top and dust-control apparatus located adjacent the top of said hopper and communicating therewith, said apparatus comprising a substantially horizontal grid, at least one dust-settling chamber surrounding the grid, a plurality of apertures located above the grid and permitting access of dust from above the grid into the upper part of the chamber, a plurality of apertures located below the grid and permitting access of dust from below the grid into the lower part of the chamber, at least one dust-extracting vent in the wall of the chamber and means for connecting the vent to dust-extracting ducting.

5. The combination claimed in claim 4, said hopper being surmounted by a hood with the dust-control apparatus located between the hood and the hopper, the top and side of the hood being provided with an opening only sufficiently large to allow a load of material to be inserted into and discharged within the hood.

6. In combination, a hopper having a top and dust-control apparatus as claimed in claim 1 located adjacent the top of said hopper and communicating therewith.

7. The combination claimed in claim 5, wherein the closed side of the hood is provided with at least one dust-extracting vent adapted to be connected to dustextracting means.

8. The combination claimed in claim 7, wherein the dust-extracting vent is in the form of a slot adapted to be connected by ducting to the dust-extracting means.

9. The combination claimed in claim 8 in further combination with means open to the atmosphere for collecting particulate material discharged from the hopper.

* * * * *